United States Patent [19]

Hasegawa et al.

[11] Patent Number: 5,062,864
[45] Date of Patent: Nov. 5, 1991

[54] GAS FILTER ELEMENT

[75] Inventors: Yoshitomo Hasegawa; Teruyuki Tsuchiya, both of Soka, Japan

[73] Assignee: SMC Corporation, Tokyo, Japan

[21] Appl. No.: 502,869

[22] Filed: Apr. 2, 1990

[30] Foreign Application Priority Data

Jul. 11, 1989 [JP] Japan ................................ 1-81353

[51] Int. Cl.$^5$ ............................................ B01D 46/12
[52] U.S. Cl. ........................................ 55/495; 55/490
[58] Field of Search ................ 55/495, 510, 485, 490, 55/492; 210/347

[56] References Cited

U.S. PATENT DOCUMENTS

| | | | |
|---|---|---|---|
| 2,708,521 | 5/1955 | Saloum | 55/510 X |
| 3,019,905 | 2/1962 | Baker et al. | 210/347 X |
| 3,082,587 | 3/1963 | Brimberg | 55/495 |
| 3,209,915 | 10/1965 | Gutkowski | 210/347 |
| 4,501,663 | 2/1985 | Merrill | 210/347 |
| 4,704,207 | 11/1987 | Chu | 210/347 |
| 4,783,262 | 11/1988 | Ostreicher et al. | 210/347 X |

Primary Examiner—Richard L. Chiesa
Attorney, Agent, or Firm—Oblon, Spivak, McClelland, Maier & Neustadt

[57] ABSTRACT

Described herein is a gas filter including a plural number of axially stacked filtration units, each unit having filter membranes bonded by thermal fusion bonding to the opposite sides of a flat holder. Influent gas channels are formed between adjacent unit of the filter, and an axial gas passage for effluent filtrate gas is provided by axially aligned center openings through the flat holders. A large number of parallel ribs are provided in closely spaced relation on each side of each flat holder, each of the ribs in turn having a gradually diminishing width in section toward the outer end thereof. A large number of gas flow apertures are defined by the ribs, and gas flow passages communicate the gas flow apertures with the center openings forming the axial gas passage. In order to increase the effective filtration area of the filter, the rubs are shaped to have a gradually diminishing width in secton toward an outer tip end presenting an arcuate surface of a small radius of curvature in section, the filter membranes are fixed to the holder by thermal fusion bonding only at inner and outer mount portions, and the respective units are securely connected with each other by thermal fusion bonding at the joint portions.

7 Claims, 5 Drawing Sheets

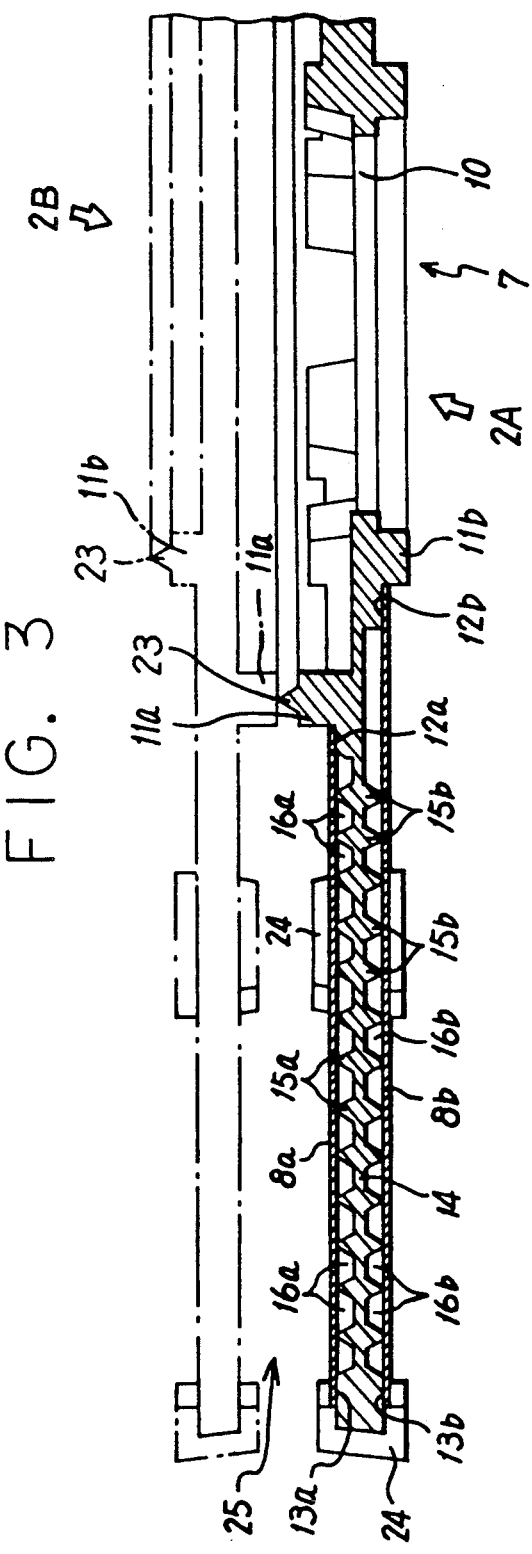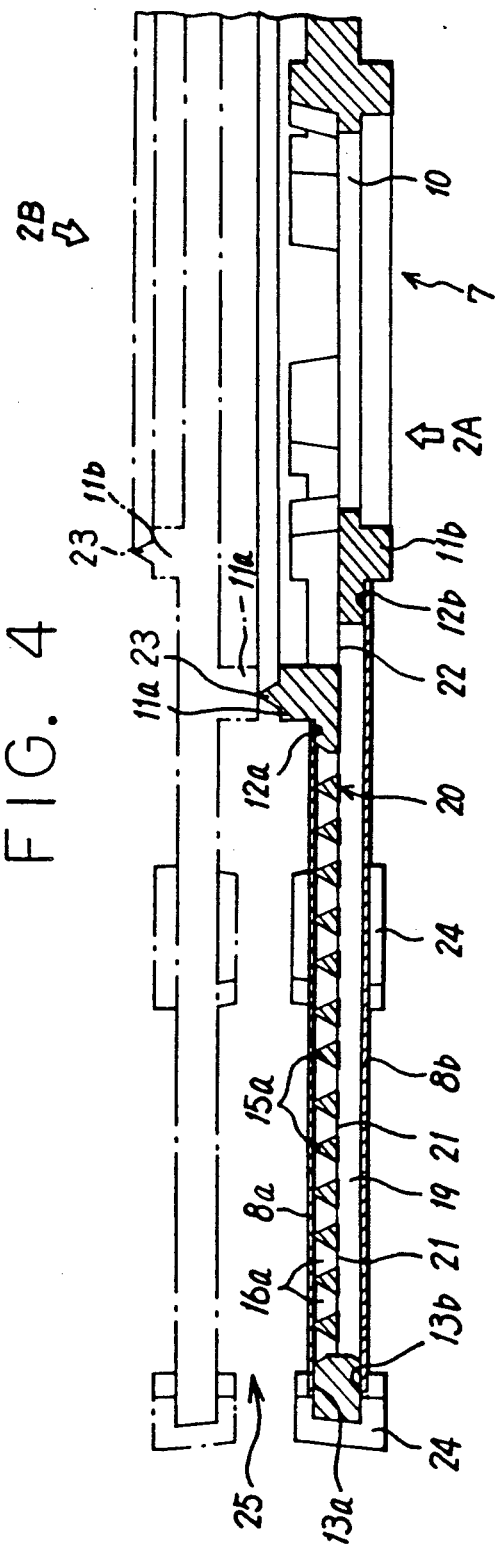

GAS FILTER ELEMENT

BACKGROUND OF THE INVENTION

1. Field of the Invention

This invention relates to a gas filter element useful for removing fine particles of foreign matter in gaseous fluids.

2. Description of the Prior Art

In this connection, there has been known in the art a liquid filter element as disclosed in U.S. Pat. No. 4,501,663, which is composed of a plural number of thin disk-like units each having filter membranes fixedly bonded on both sides thereof and being connected successively in a spaced relation in the axial direction, forming liquid induction channels between the opposing filter membranes of adjacent units.

The filter element of this sort, in which the liquid flowing into the channels between the adjacent units is passed through the filter membranes of a relatively large area on the opposite sides of each liquid induction channel, has an advantage that the element can afford a relatively large filtration area compared with its entire volume. However, in order to secure sufficient strength of the filter membranes, it has been the general practice to fixedly bond the membranes not only to the mount portions at the inner and outer peripheral edges of the holder but also to a large number of ribs which are provided in closely spaced relation between the inner and outer mount portion of the holder. The total area taken up for bondage between a filter membrane and a holder usually amount to an unignorably large proportion of the area of the filtration membrane as a whole, resulting in a material reduction in the effective filtration area of the membrane. Presumably, such a reduction is as large as 15% or more in most cases.

Further, in a case where part of the holder is dissolved by the use of a solvent or where an adhesive is applied to a large number of ribs, it is required to bond the filter membranes to the holder very carefully since application of an excessive amount of solvent or adhesive might block the pores in the membranes. There is also a problem that, unless the bonded portions are dried to a sufficient degree, it is difficult to obtain a clean filtrate fluid since the solvent would be entrained into the filtrate while passing through the filter element.

In order to eliminate these problems, it is desirable to fix the membranes to a holder by thermal fusion bonding, which is however extremely difficult to apply to the bondage between a membrane and a large number of closely spaced ribs in view of the problem of partial meltdown which might occur to the filter membranes.

SUMMARY OF THE INVENTION

The present inventors have conducted a research with a view to developing a gas filter using a filter element with a large filtration area as mentioned hereinbefore, and found that, in case of filtration of gaseous fluid, the bonding of a filter membrane to a large number of ribs on a holder can be dispensed with by forming the respective ribs into an appropriate shape.

Namely, in case of filtration of a liquid, it is necessary to increase the strength of the filter membrane by securely bonding same to a large number of closely spaced ribs on a holder because of the nature of the liquid which produces a large back pressure and a back flow upon stopping the liquid flow. In this regard, it has been confirmed that, in case of gas filtration which involves far smaller back pressures and back flows as compared with the liquid filtration, there is no need for bonding a filter membrane to a large number of ribs as long as measures are provided to cope with the repeated engagement and disengagement of the filter membranes with and from the ribs on the holder.

The present invention has been achieved on the basis of these findings, and has as its object the provision of a gas filter element composed of a number of filter units each supporting filter membranes on the opposite sides of a holder which has a large number of ribs in an intermediate portion between inner and outer peripheral edges, the filter membranes being bonded to the holder only at mount portions at the inner and outer peripheral edge portions thereof, without necessitating bondage to the large number of ribs in the intermediate portion of the holder.

It is another object of the present invention to provide a gas filter element which is constructed to prevent easy damages to filter membranes which might otherwise occur when the membranes are repeatedly brought into and out of engagement with the ribs on a holder as a result of pressure fluctuations upstream or downstream of the filter element.

It is a further object of the invention to provide a gas filter element having filter membranes bonded to a holder only at mounting portions at the inner and outer peripheral edges of the holder in such a way as to increase the effective filtration area by substantially eliminating the bonded areas as necessitated for fixation of the filter members to a large number of ribs on the holder.

It is still another object of the invention to provide a gas filter element having filter membranes bonded to a holder only at mounting portions at the inner and outer peripheral edges of the holder in such a way as to facilitate the fixation of the membranes to the holder by substantially eliminating the bonded areas as necessitated for fixation of the filter membranes to a large number of ribs on the holder.

It is a further object of the invention to provide a gas filter element having filter membranes bonded to a holder only at mounting portions at the inner and outer peripheral edges of the holder in such a way as to permit thermal fusion bonding or heat-welding of the holder and membranes in a facilitated manner.

It is a further object of the invention to provide a gas filter element which permits fusion bonding or heat-welding of filter membranes and a holder as well as ultrasonic welding of the respective units of the filter element to preclude entrainment of a solvent into filtrate gas as experienced in operation in case of a filter element using an adhesive or the like.

For achieving the above-stated objects, the present invention provides improvements in construction of a filter element of the type which is composed of a plural number of units each having filter membranes bonded to the opposite sides of a flat holder with an opening at the center thereof and being connected successively in the axial direction in spaced relation to form an influent gas channel between the opposing membranes of adjacent connected units with the center openings thereof in communication with each other in the axial direction, the filter membranes are bonded to the holder only at membrane mount portions at the inner and outer peripheral edges of the latter.

More specifically, each of above-mentioned holders is provided with a center opening to conduct a filtrate gas flow in the axial direction, an annular joint portion formed on each side thereof around and on the outer side of the center opening and connectible to an a similar filter unit unit in an axially spaced relation to provide an influent gas channel therebetween, an annular inner mount portion formed around the joint portion on each side of the holder for fusion bonding inner peripheral portions of a filter membrane thereto, an outer mount portion formed along the outer peripheral edge of the holder on each side thereof for fusion bonding outer peripheral portions of the filter membrane thereto, a partition plate connecting the inner and outer mount portions, a large number of ribs formed parallelly in closely spaced relation on the opposite sides of the partition plate and each shaped to have a gradually diminishing width in section toward an outer tip end presenting an arcuate surface of a small radius in section, a multitude of gas flow apertures defined by the ribs, and filtrate gas passages communicating the gas flow apertures with the center opening, the filter membranes being fusion bonded or heat-welded to the holder only at the inner and outer mount portions.

With a filter element of the above-described construction, fine particles of foreign substances in a gas which has been introduced from outside into the influent gas channels between the respective units are removed as the gas flows into the gas flow apertures between the ribs through the filter membranes on the opposite sides of the holder, and the clean filtrate gas flows through gas flow passages into the center opening which leads to a gas outlet. The filter membranes are pressed against the ribs by the gas pressure and repeatedly brought into and out of contact with the ribs. However, damages to the membranes are suitably prevented since the tip ends of the ribs are rounded into an arcuate shape in section. Besides, the gas can be filtered almost over the entire area of each membrane because the ribs and filter membranes are not bonded to each other and the outer ends of the ribs are tapered to minimize their areas of contact with the membrane, securing a larger effective filtration area to permit a greater gas flow rate.

BRIEF DESCRIPTION OF THE DRAWINGS

In the accompanying drawings:
FIGS. 3 and 4 are sectional views of a unit of filter element taken on lines A—A and B—B, respectively.

DESCRIPTION OF PREFERRED EMBODIMENTS

Figure 6:
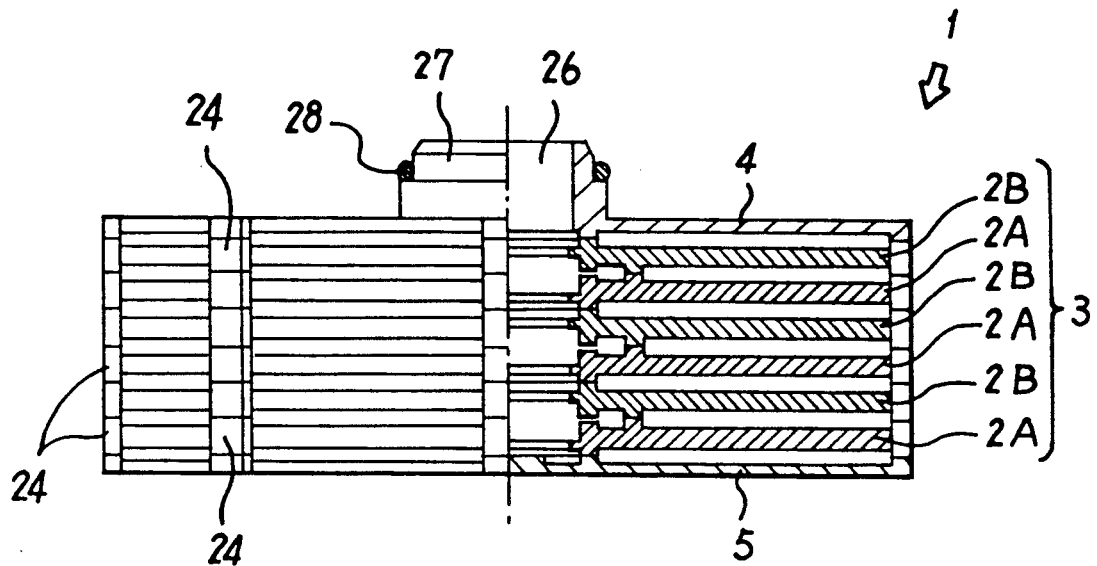
FIG. 6 is a half-sectioned view of a filter element.

Referring to FIGS. 1 to 4, there is shown one unit of a filter element 1 which is used by connecting a suitable number of units as illustrated in FIG. 6. The filter element 1 is composed of a filter unit assembly 3 formed by alternately coupling units 2A and 2B in the axial direction, and a support member 4 and a protective plate 5 which are attached to the opposite axial ends of the unit assembly 3.

As seen in FIGS. 3 and 4, the units 2A are each provided with a flat disk-like holder 7 and a pair of filter membranes 8a and 8b which are secured to the opposite sides of the holder 7 by thermal fusion bonding.

The filter membranes are the so-called membrane filter, that is, a flexible synthetic resin sheet (e.g., polytetrafluoroethylene) of about 0.1 mm in thickness containing a multitudes of pores of about 0.2 μm in diameter. For example, GOATEX Membrane (a tradename of Japan Goatex) is suitable for the filter membranes.

As shown in FIGS. 1 to 4, each holder 7 is provided with a center opening 10 to conduct filtrate gas flows in the axial direction of the connected units, annular joint portions 11a and 11b formed around the center opening 10 on the opposite sides of the holder 7 and projecting in the axial direction for joining the holder with other unit or units with the respective center openings 10 in communication with each other, inner mount portions 12a and 12b provided on the outer side of the joint portions 11a and 11b for fusion bonding thereto inner peripheral portions of filter membranes, an outer annular mount portions 13a and 13b provided along the outer peripheray of the holder for fusion bonding thereto outer peripheral portions of filter membranes, a partition plate 14 connecting the inner and outer mount portions, a large number of ribs 15a and 15b of substantially triangular shape in section provided in closely spaced relation on each side of the holder between and concentrically with the inner and outer mount portions, and a multitude of gas flow apertures 16a and 16b formed between the respective ribs.

Figure 1:
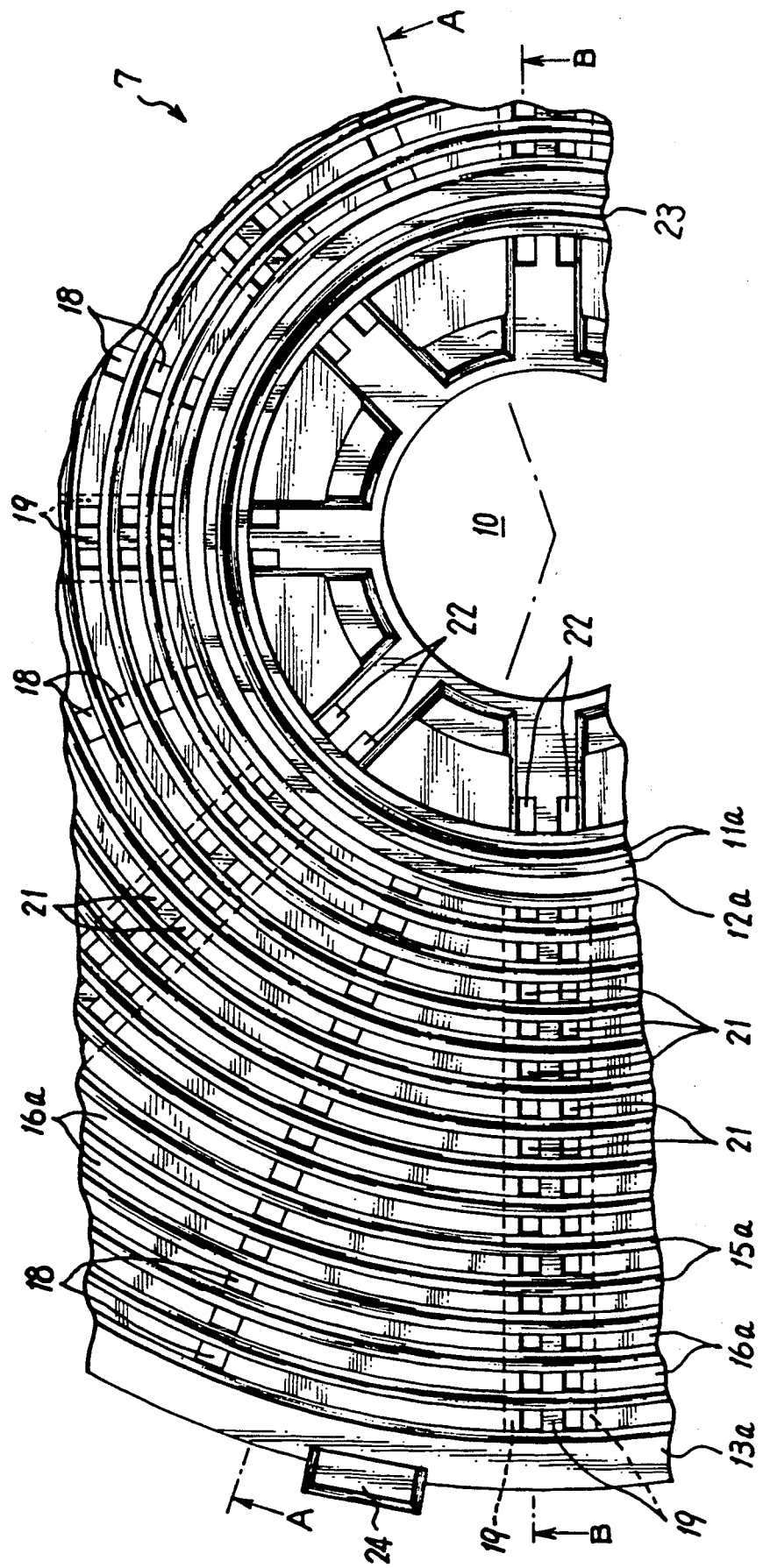
FIG. 1 is a fragmentary plan view of a holder.
Figure 2:
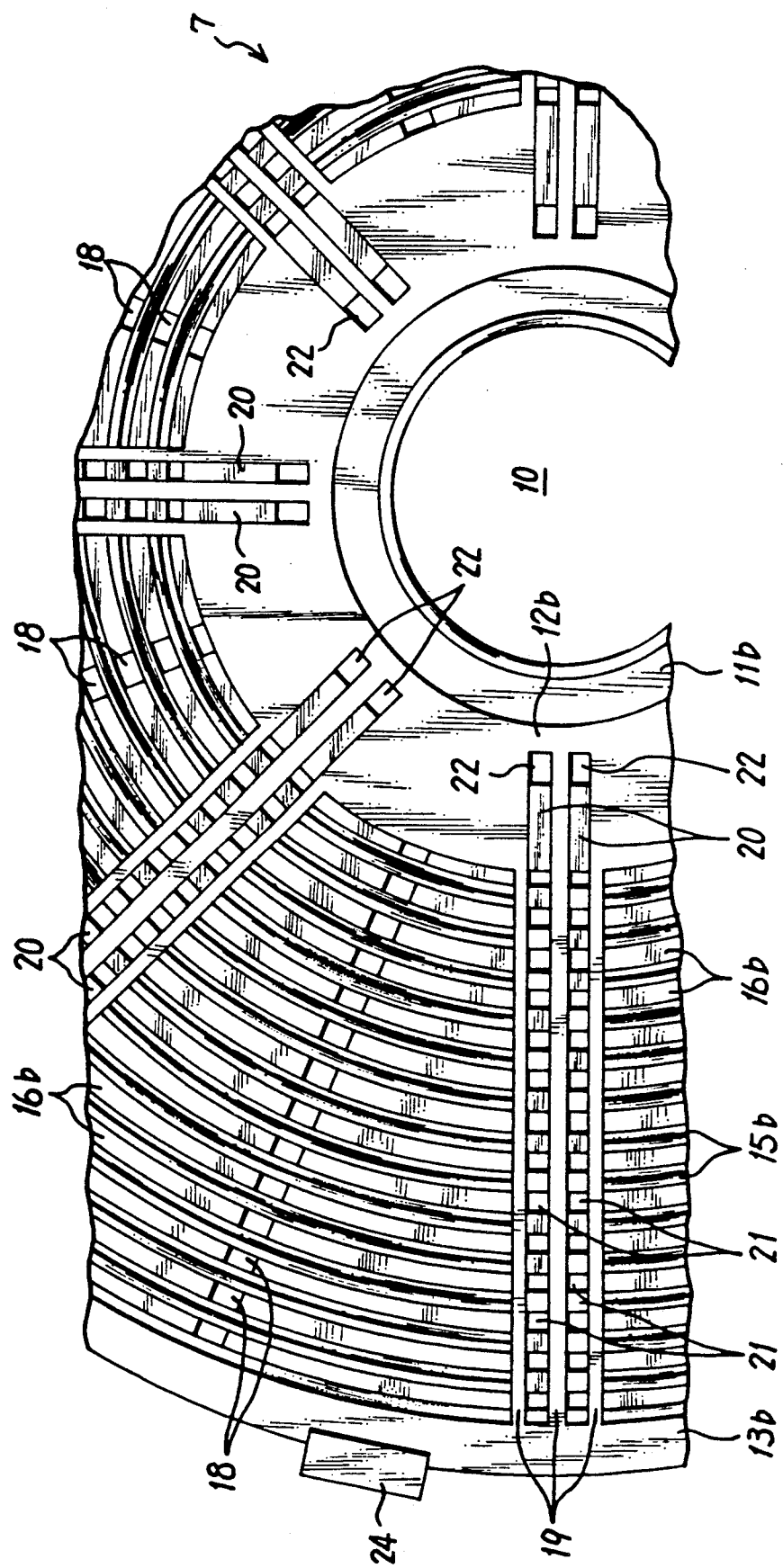
FIG. 2 is a fragmentary back view of the same holder.
Figure 5:
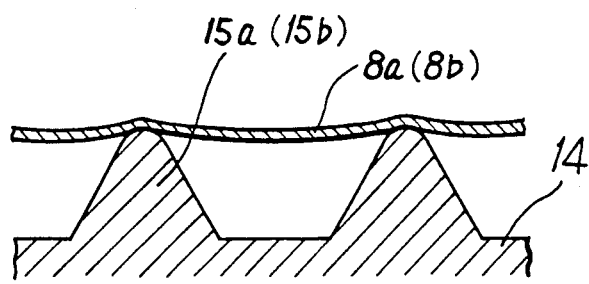
FIG. 5 is an enlarged sectional view of ribs on the holder.

As seen in FIG. 5, the ribs 15a and 15b have a sectional shape which is gradually tapered toward the outer end and which terminates in an arcuate surface of small radius at the outer tip end. In case of the particular example shown, ribs of 0.35 mm in height and 0.1-0.3 mm in radius of curvature of the arcuate surface at the outer tip end are provided in a pitch of 1.3 mm. If the radius of curvature becomes smaller than that range, the possibility damaging the filter membranes 8a and 8b will become greater as they are pressed against or repeatedly brought into and out of contact with the tip ends of the ribs. On the other hand, a radius of curvature larger than the above-stated range is reflected by an increased area of contact with the filter membrane and thus by a reduction in effective filtration area.

The partition plate 14 is provided with a plural number of first radial gas passages 18 at regular intervals to communicate with each other the circumferential gas flow apertures 16a and 16b on the opposite sides of the holder. On the side of the ribs 15b (on the rear side) and at a number of circumferentially spaced positions, the partition plate 14 is provided with three ribs 19 which have the same height as the ribs 15. Between the three radial ribs 19, the circumferential ribs 15b are omitted to provide a couple of radial gas flow apertures 20. These radial gas flow apertures 20 are communicated with the circumferential apertures 16a on the opposite side of the holder through a large number of second gas passages 21 formed in the apertures 20, and at the same time communicated with the center opening 10 through third gas passages in the central regions. Through these gas flow passages 18, 21 and 22 and the radial gas flow apertures 20, the circumferential gas flow apertures 16a and 16b are communicated with the center opening 10.

The filter membranes 8a and 8b are securely attached by fusion bonding to the inner mount portions 12a and 12b and the outer mount portions 13a and 13b in the inner and outer peripheral portions of the holder, the intermediate portions of the membranes 8a and 8b being simply abutted on the ribs 15a and 15b without fixation to the latter. Along with the substantially triangular sectional shape of the ribs 15a and 15b, this contributes to increase the effective filtration area permitting to filter a gas through almost the entire areas of the membranes 8a and 8b, and to facilitate their fusion bonding or thermal welding to the holder. The fusion-bonded filter membranes are free from the problem of entrainment of residual solvent in the filtrate gas as experienced with the adhesive-bonded membranes.

The annular joint portion 11a on the holder 7 has a thermally fusible joint portion 23 of sectionally triangular shape integrally attached thereof by fusion bonding for engagement with a corresponding coupling member on the filter unit 2B. The joint portion 23 which is fusible by application of heat serves to connect the filter unit to an adjacent unit. Upon joining a number of filter units at the joint portions, the respective filter units are aligned in the axial direction forming an inflow gas channel 25 between the opposing filter membranes of adjacent units and communicating the center openings of the respective units with each other. Spacer members 24 projecting on the front and rear sides of the holder are 7 provided at a number of positions around the outer periphery of the holder 7 to maintain the gas inflow channels 25 between the filter membranes of adjacent units even when the units 2A and 2B are inclined for some reason.

The filter unit 2B has the same construction as the above-described filter unit 2A except that a thermally fusible connecting portion 23 is formed on the joint portion 11b as indicated by a chain line in FIGS. 3 and 4.

When connecting these filter units 2A and 2B with each other, the front sides or the rear sides of the units are positioned in face to face relation, and ultrasonic wave is applied to the fusible connecting portion 23 to weld the opposing joint portions 11a or 11b to each other, communicating the center openings of the respective units in the axial direction. A suitable number of filter units are connected in this manner to obtain a stack of filter units 3. As mentioned hereinbefore, the thermal fusion bonding or heat welding of the filter units 2A and 2B precludes the problem of the entrainment of solvent gas in the filtrate gas, which would occur in case of adhesive-bonded filter units.

As seen in FIG. 6, the support 4 which is attached to one end of the stacked filter assembly 3 is centrally provided with a cylindrical portion 27 which is abutted on the end face of the connected filter units 3 to provide a hermetically sealed gas outlet 26 at one end of the axial flow passage defined by the center openings 10. An O-ring 28 is fitted on the cylindrical portion 27 to seal the gap space between the cylindrical portion 27 and a casing which will be described hereinlater. The other end of the axial flow passage is closed by the protective plate 5.

Figure 7:
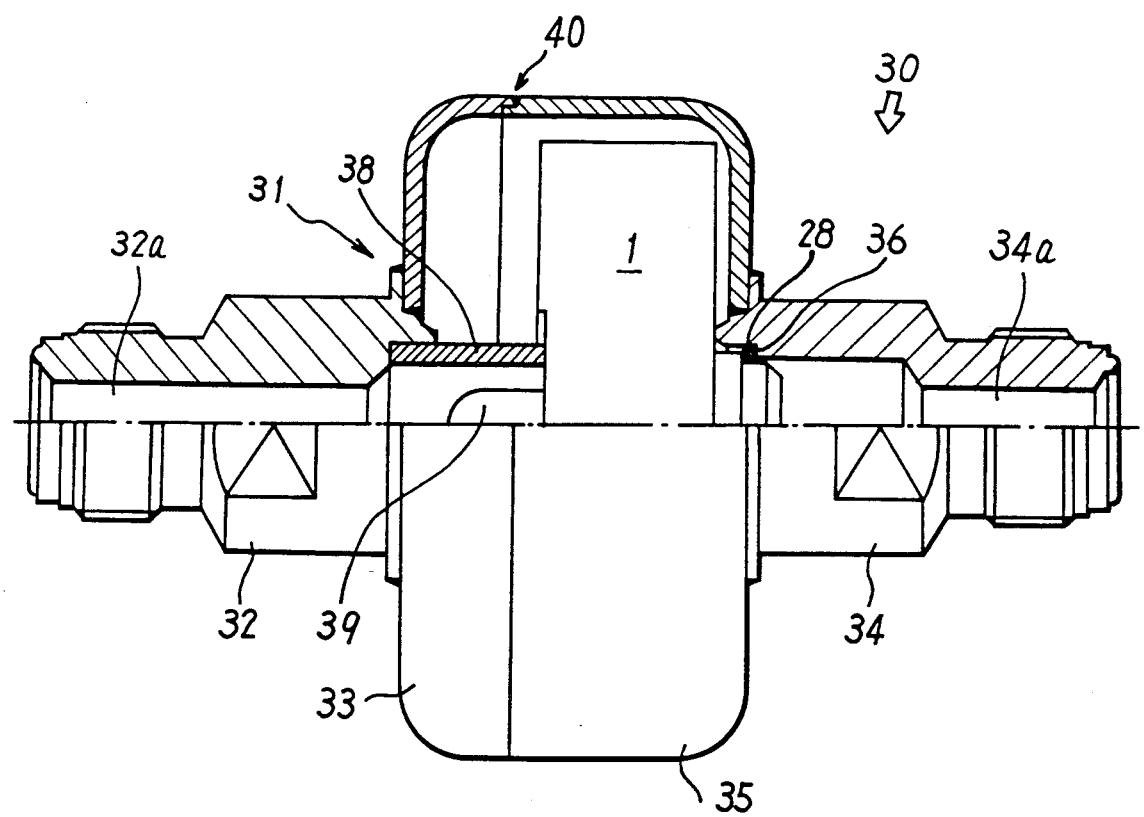
FIG. 7 is a half-sectioned view of a filter casing accommodating the filter element.

FIG. 7 illustrates a filter 30 which has the filter element 1 fitted in its casing 31. The filter casing 31 is constituted by inlet and outlet caps 33 and 35 which have gas inlet and outlet pipes 32 and 34 securely fixed thereto respectively. The inlet and outlet pipes 32 and 34 are provided with gas inlet and outlet passages 32a and 34a, respectively, in alignment with each other in the axial direction.

The filter element is fitted in the casing 31 in such a manner that the O-ring 28 is tightly gripped between a stepped wall portion on the outer periphery of the cylindrical portion 27 of the support 4 and a notched or stepped wall portion 36 on the inner periphery of the gas outlet passage 34a, and fixed in the casing 31 by a spacer 38 which is fitted in the gas inlet pipe 32 at one end and adapted to press the protective plate 5 at the other end thereof. The spacer 38 is provided with a number of openings 39 to guide the feed gas from the inlet pipe 32 toward the circumference of the filter element. After fitting the filter element 1 and spacer 38 in position, the caps 33 and 35 are joined by welding to obtain a disposable filter 30 which contains the filter element 1 therein.

When welding the casing 31, it is desirable to weld the caps 32 and 35 together at a position 40 closer to the inlet side of the casing 31 and to feed an inert gas into the casing 31 for the purpose of lessening the effects of welding heat on the filter element 1 and preventing oxidation of the inner surfaces of the casing.

The spacer 38 plays an important role for fixation of the filter element 1. Namely, by pressing the filter element 1 against the stepped portion in the notched wall portion of the outlet pipe 34, the gap between the support 5 and the outlet passage 34a is hermetically sealed by the O-ring 28. Further, the spacer 38 serves to absorb dimensional errors even if there may occur variations in axial length as a result of the ultrasonic welding of the filter units 2A and 2B at the fusible portion 23. Therefore, the spacer may be in the form of a coil spring or the like.

The interior surfaces of the casing 31 should be polished and washed to a sufficient degree to prevent deposition of foreign matter. In this connection, the provision of the spacer 38 which reduces the extension lengths of the inlet and outlet pipes 32 and 34 into the caps 33 and 35 is extremely effective for improving the internal cleanliness of the caps (the accessibility in polishing and washing operations). The inlet and outlet pipes 32 and 34 are welded to the inlet and outlet caps 33 and 35 along the respective outer and inner peripheries to provide a seal therebetween, which contributes to prevent intrusion of foreign substances during the polishing and washing operations while preventing occurrence of defects such as corrosion or the like.

In operation, the gas which enters the filter 30 through the inlet pipe 32 flows into the casing 31 through the openings 39 in the spacer 38 and then into the influent gas channels 25 between the respective filter units 2A and 2B. The fine particles of solid foreign substances are removed as the gas passes through the filter membranes 8a and 8b on the opposite side of each influent gas channel 25. The non-fixation of the filter membranes 8a and 8b to the ribs 15a and 15b and the small sectional area of the tapered outer ends of the ribs 15a and 15b afford an increased effective filtration area to the filter to cope with a higher gas flow rate.

The gas which enters the circumferential apertures 16a of the holder through the filter membrane 8a flows into the radial apertures 20 through the second gas flow passages 21, and then flows into the center opening 10 through the third gas flow passages 22. On the other hand, the gas which enters the circumferential apertures 16b through the filter membrane 8b flows through the first gas flow passage 18 into the circumferential apertures 16a which face the opposite direction, and likewise flows into the center opening 10 through the same gas flow passages. All of the gas in the axial passage defined by the center openings 10 flows out of the filter 30 through the outlet pipe 34.

Although the invention has been described by way of preferred embodiments, it is to be understood that various alterations or modifications can be added thereto without departing from the scope of the invention as encompassed by the appended claims.

What is claimed is:

1. A gas filter element comprising:
    a plural number of units each having a flat holder and filter membranes bonded to the opposite sides of said flat holder;
    a center opening provided in said holder defining an axial gas passage for effluent filtrate gas;
    an annular joint portion formed around said center opening and connectible to an adjacent unit in such a manner as to form an influent gas channel between connected units and to communicate said center opening of the connected units axially with each other;
    an annular inner membrane mount portion formed around said joint portion on each side of said holder, said annular inner membrane mount portion being bonded by thermal fusion bonding to inner peripheral portions of said filter membranes;
    an outer membrane mount portion formed on each side of said holder along the outer periphery thereof, said outer membrane mount portion being bonded by thermal fusion bonding to outer peripheral portions of said filter membranes;
    a partition plate connecting said inner and outer mount portions with each other;
    a large number of parallel ribs provided in closely spaced relation on each side of said holder and each having a gradually diminishing width in section toward an outer end with an arcuate surface with a small radius of curvature;
    a large number of gas flow apertures defined by said ribs; and
    a plurality of gas flow passages communicating said apertures with said center openings; wherein said filter membranes are fixed to said holder by thermal fusion bonding only at said inner and outer mount portions; and
    said units are securely connected with each other by thermal fusion bonding at said joint portions.

2. A gas filter element as defined in claim 1, wherein said filter membranes are each in the form of a flexible synthetic resin sheet of approximately 0.1 mm in thickness and contain a multitude of pores of approximately 0.2 $\mu$m in diameter.

3. A gas filter element as defined in claim 1, wherein said ribs are provided concentrically on each side of said partition plate and define a large number of circumferential gas flow apertures therebetween.

4. A gas filter element as defined in claim 3, wherein said partition plate of said holder is provided with a first gas flow passage for communicating gas flow apertures on the opposite sides of said holder with each other, a plural number of radial gas flow apertures defined by a number of radial ribs of the same height as said ribs, a large number of second gas flow passages opened in said partition wall in said radial gas flow apertures, a third gas flow passage communicating said radial gas flow apertures with said center opening, said gas flow passages and radial gas flow apertures forming gas flow passages for communicating said circumferential gas flow apertures with said center opening.

5. A gas filter element as defined in claim 1, wherein said ribs on the opposite sides of said partition plate are each shaped to have at the outer tip end thereof an arcuate surface in section having a radius of 0.1-0.3 mm.

6. A gas filter element as defined in claim 1, wherein said annular joint portion of said holder is integrally provided with an annular thermally fusible protuberance of triangular shape in section for connecting said joint portion to another filter unit by fusion bonding.

7. A gas filter element as defined in claim 1, wherein said holder is provided with forwardly and rearwardly projecting spacer members at a number of spaced positions around the outer periphery thereof to maintain said influent gas channels between filter membranes of adjacent units.

* * * * *